United States Patent
Pearson, Jr. et al.

(10) Patent No.: US 6,433,631 B2
(45) Date of Patent: Aug. 13, 2002

(54) RF SLIPRING RECEIVER FOR A COMPUTERIZED TOMOGRAPHY SYSTEM

(75) Inventors: Phil E. Pearson, Jr., Hartland, WI (US); Michael H. Harris, Blacksburg, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/928,620

(22) Filed: Aug. 13, 2001

Related U.S. Application Data

(62) Division of application No. 09/282,535, filed on Mar. 31, 1999, now Pat. No. 6,301,324.

(51) Int. Cl.[7] .......................... H03D 1/00; H04L 27/06; H04L 27/08
(52) U.S. Cl. .................. 329/311; 329/350; 375/285; 375/338; 375/345; 375/346; 375/350
(58) Field of Search .................... 329/311–314, 347, 329/349, 350; 455/63, 66, 234.1, 249.1, 250.1; 375/268–270, 285, 320–321, 338–339, 340, 345, 346, 350

(56) References Cited

U.S. PATENT DOCUMENTS

| | | | | |
|---|---|---|---|---|
| 3,515,992 A | * | 6/1970 | Marbury | 375/338 |
| 4,323,292 A | | 4/1982 | Lewis et al. | 339/5 M |
| 4,329,004 A | | 5/1982 | Lewis | 339/5 M |
| 4,682,344 A | * | 7/1987 | Somer | 375/303 |
| 5,018,174 A | | 5/1991 | Collins | 378/4 |
| 5,140,696 A | * | 8/1992 | Fox | 455/41 |
| 5,157,393 A | * | 10/1992 | Fox et al. | 340/870.3 |
| 5,175,754 A | | 12/1992 | Casey et al. | 378/4 |
| 5,208,581 A | | 5/1993 | Collins | 340/671 |
| 5,261,004 A | * | 11/1993 | Manlove et al. | 381/15 |
| 5,287,117 A | * | 2/1994 | Posluszny | 343/763 |
| 5,412,783 A | * | 5/1995 | Skokan | 710/105 |
| 5,530,422 A | | 6/1996 | Harrison | 340/500 |
| 5,530,423 A | | 6/1996 | Harrison | 340/500 |
| 5,530,424 A | | 6/1996 | Harrison et al. | 340/500 |
| 5,530,425 A | | 6/1996 | Harrison | 340/500 |
| 5,577,026 A | * | 11/1996 | Gordon et al. | 370/24 |
| 5,579,357 A | * | 11/1996 | Harrison | 378/4 |
| 5,600,697 A | | 2/1997 | Harrison | 378/15 |
| 5,646,962 A | | 7/1997 | Harrison | 375/308 |
| 5,737,356 A | * | 4/1998 | Harrison et al. | 375/200 |
| 5,828,273 A | * | 10/1998 | Harrison | 333/127 |
| 5,828,719 A | | 10/1998 | He et al. | 378/4 |
| 6,181,766 B1 | * | 1/2001 | Pearson, Jr. et al. | 378/15 |
| 6,194,978 B1 | * | 2/2001 | Romano | 332/107 |

* cited by examiner

Primary Examiner—David Mis
(74) Attorney, Agent, or Firm—Foley & Lardner; Peter J. Vogel; Michael A. Della Penna

(57) ABSTRACT

A computerized tomography (CT) system having an apparatus and method for receiving high data rate communication is disclosed herein. The apparatus includes a controlled variable attenuator for attenuating an encoded digital data signal having a wide range of power levels, a digital envelope detector for de-encoding the encoded digital data signal, a noise filtering circuit for filtering out the residual undesirable encoded signal components, and a feedback loop for maintaining a desired signal level such that the encoded digital data signal is converted to its pre-encoded state suitable for processing to generate a CT image.

25 Claims, 3 Drawing Sheets

RF SLIPRING RECEIVER FOR A COMPUTERIZED TOMOGRAPHY SYSTEM

CROSS REFERENCE TO RELATED APPLICATIONS

The present application is a divisional of U.S. application Ser. No. 09/282,535 by Pearson et al., entitled "RF Slipring Receiver for a Computerized Tomography System" filed on Mar. 31, 1999, now U.S. Pat. No. 6,301,324, and which is incorporated herein by reference.

BACKGROUND OF THE INVENTION

The present invention relates generally to computerized tomography (CT) systems. More particularly, the present invention relates to an apparatus and method for receiving high data rate communication in a CT system.

CT systems are used to obtain non-invasive sectional images of test objects, particularly internal images of human tissue for medical analysis and treatment. Current CT systems position the test object, such as a patient, on a table within a central aperture of a rotating frame, or gantry, which is supported by a stationary frame. The gantry includes an x-ray source and a detector array positioned on opposite sides of the aperture, within an x-y plane of a Cartesian coordinate system (generally referred to as the "imaging plane"), such that both rotate with the gantry around the test object being imaged. At each of several angular positions along the rotational path of the gantry (also referred to as "projections"), the x-ray source emits a fan-shaped collimated beam which passes through the imaging slice of the test object, is attenuated by the test object, and is received by the detector array. Each detector element in the detector array produces a separate electrical signal indicative of the attenuated x-ray beam intensity, the beam projected from the x-ray source to the particular detector element, incident at its sensor surface. The electrical signals from all the detector elements are collated by circuitry within the rotating frame to produce a projection data set at each gantry angle or projection. Each projection data set is referred to as a "view", and a "scan" is a set of such views from the different gantry angles during one revolution of the x-ray source and detector array. The scan is then processed by a computer in the stationary frame to reconstruct the projection data sets into a CT image of the slice or cross-section of the test object.

To transfer the projection data sets from the rotating frame to the stationary frame for image reconstruction, various communication links such as an umbilical cable, an optical data link, a slipring with a contacting brush, and a slipring with a contactless coupler are currently available. Newer CT systems typically utilize a slipring disposed on the rotating frame with a contactless coupler, having a certain air gap with respect to the slipring, disposed on the stationary frame as the communication link between the rotating and stationary frames. The slipring comprises a broken circle of wire or transmission line encircling the aperture of the rotating frame such that each half of the broken circle of wire forms an arc of exactly the same length. Data signals, e.g., the projection data sets, are encoded and transmitted from the first ends of the two wires to the second ends of the two wires at the opposite side of the broken circle such that both data signals arrive at the second ends, generally referred to as the termination gap, at the same time. The contactless coupler disposed on the stationary frame lies close to the slipring and captures the transmitted encoded data signals via electromagnetic coupling. Because each projection data set is transmitted as they are acquired (after encoding), i.e. while the rotating frame is still rotating to acquire the next projection data set for the next gantry angle, propagation of the data signals along the wires of the slipring and electromagnetic coupling from the slipring to the contactless coupler occurs while the rotating frame and thus the slipring are in rotation.

Unfortunately, although the slipring and contactless coupler provides many advantages over other types of communication links such as higher data rate transfer, shorter image acquisition time, increased patient comfort, and less mechanical stress and wear, it also suffers from problems associated with controlling the data signal strength present at the contactless coupler. Data signals received by the contactless coupler can have a power variation of up to 15 to 20 dB around its center operating power level. It has been found that numerous sources contribute to the signal strength variability, including, but not limited to: (1) axial and/or radial rotation runouts of the rotating assembly; (2) axial and/or radial misalignment of the contactless coupler; (3) variability of the printed circuit board within the channel groove; (4) nominal air gap losses; (5) accuracy of the dimensions of the various components of the rotating assembly such as the channel groove; (6) skin effect and dielectric losses in ring circuit board traces; and (7) amplifier gain variability. Moreover, although attempts have been made to correct signal variation resulting from any one contributing source, it is difficult, time consuming, and costly to correct the variations caused by all of these contributing sources given the interaction between these sources in CT systems.

Thus, there is a need for an apparatus and method capable of accommodating wide variations in the data signal strength received by a contactless coupler in a CT system. Moreover, there is a need for such an apparatus and method to be efficient, cost effective, flexible to the range of signal variations, and to enhance, or at least not counteract, the advantageous capabilities of a communication link comprised of a slipring with a contactless coupler in a CT system.

BRIEF SUMMARY OF THE INVENTION

One exemplary embodiment relates to an apparatus for demodulating and digitizing a modulated data signal possibly having a wide range of power levels. The apparatus includes a variable attenuation circuit configured to attenuate an amplitude of the modulated data signal in response to a feedback signal to generate an amplitude stabilized signal, and a conversion circuit coupled to the variable attenuation circuit and configured to remove a modulation component from the amplitude stabilized signal to generate a digitized signal. The apparatus further includes a circuit coupled to the conversion circuit and configured to generate a reconstructed digital data signal and an amplitude signal from the digitized signal, and an attenuation controller coupled to the circuit and the variable attenuation circuit. The reconstructed digital data signal is representative of the modulated data signal in a pre-modulated state. The amplitude signal is representative of an amplitude of the digitized signal. The attenuation controller is configured to generate the feedback control signal from the amplitude signal.

Another exemplary embodiment relates to an apparatus for demodulating and digitizing a modulated data signal possibly having a wide range of power levels. The apparatus includes means for variably attenuating the modulated data signal in response to a feedback signal to generate an amplitude stabilized signal, and means for digitizing the amplitude stabilized signal to generate a digitized signal. The apparatus further includes means for filtering the digitized signal to generate a reconstructed digital data signal representative of the modulated data signal in a pre-modulated state, and means for generating the feedback signal in response to the digitized signal. The feedback signal is representative of an amplitude of the digitized signal.

Still another exemplary embodiment relates to a method for demodulating and digitizing a modulated data signal possibly having a wide range of power levels. The method includes transmitting the modulated data signal from a first location, and receiving the modulated data signal at a second location. The first and second locations are remote from each other. The method further includes attenuating an amplitude of the modulated data signal in response to a previous modulated data signal via a feedback loop, and converting the modulated data signal into a reconstructed digital data signal. The reconstructed digital data signal is representative of the modulated data signal in a pre-modulated state. The attenuating and converting steps are carried out at the second location. The modulated data signal comprises a signal having a power level range of up to 50 dBm around a center operating power level.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE INVENTION

Figure 1:
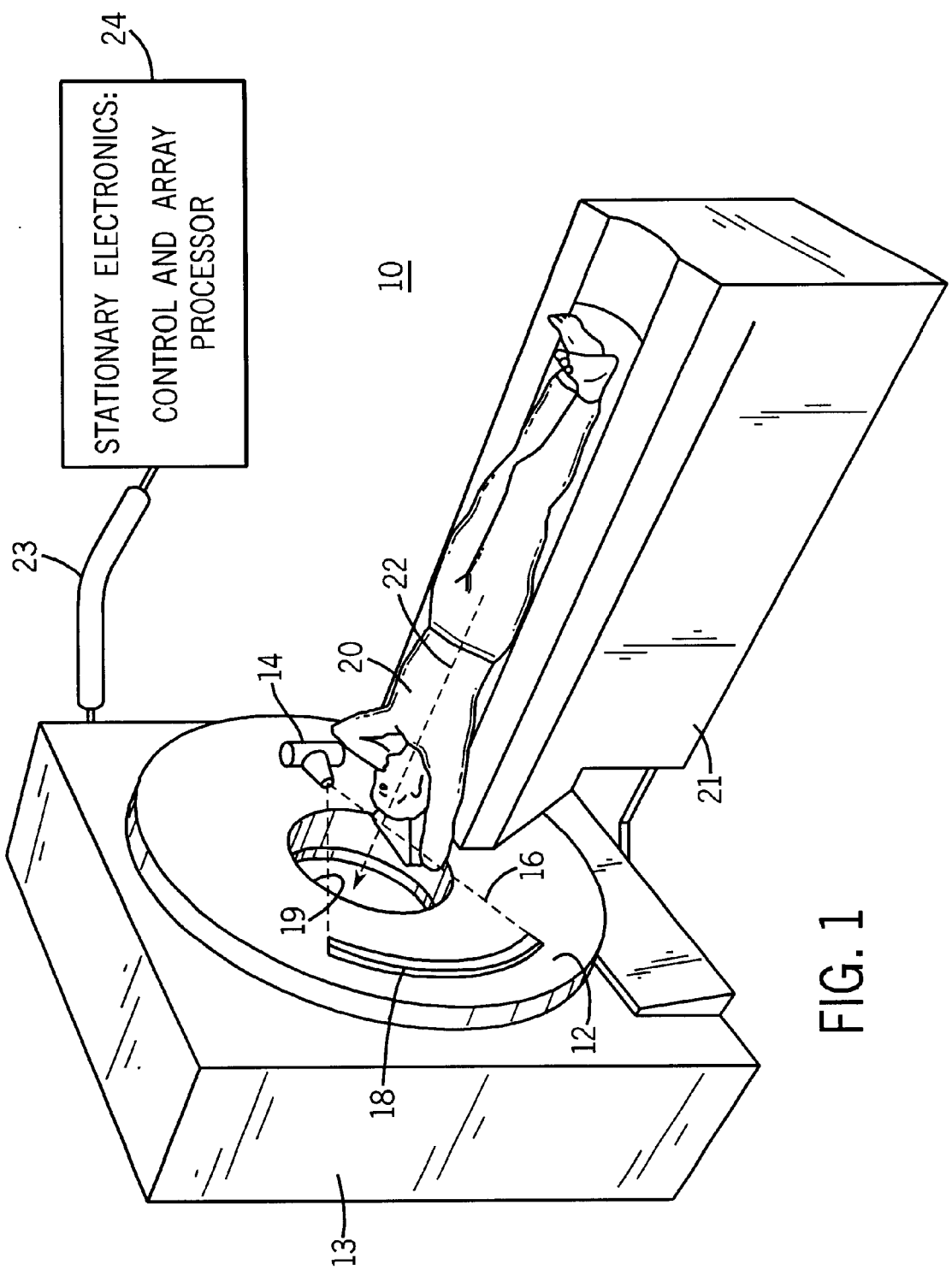
FIG. 1 is a perspective view of a CT system which employs the present invention.

Referring to FIG. 1, a computerized tomography (CT) system 10 includes a generally annular rotating frame 12 or gantry, and a stationary frame 13 that supports rotating frame 12. Rotating frame 12 includes an x-ray source 14 for emitting a highly collimated x-ray beam 16 toward a detector array 18 positioned on the opposite side of an aperture 19. Aperture 19 permits a test object 20, such as a patient, to be placed on a platform 21 which may be movable, for example, by translation, along rotating frame's 12 rotational axis 22. Movement of platform 21 allows different cross-sectional portions of interest of test object 20 to be positioned within the imaging plane of rotating frame 12.

Once test object 20 has been positioned within aperture 19, as desired, by movement of test object 20 and/or platform 21, rotating frame 12 rotates about the rotational axis 22, and at each of a plurality of angular positions along the rotational path, x-ray source 14 emits x-ray beam 16 which passes through test object 20 and is incident on the receiving surfaces of a plurality of detector elements (not individually shown) of the detector array 18. In response, each of the detector elements of detector array 18 produces an electrical signal at a magnitude proportional to the intensity of the received rays, and thus to the amount of attenuation of the x-ray beam after passing through test object 20. As described in further detail hereinafter, the signals from each of the detector elements of detector array 16, which represent the projection data, are presented through lines 23 to a control and array processor 24 that processes the received projection data into a radial image of test object 20 at the selected radial or angular position, which is referred to as a view. Then the aggregate of the views taken over a full revolution of the rotating frame 12, generally referred to as a scan, are further processed, using known image processing algorithms, into a cross-sectional image of the portion of interest of test object 20 that was within the imaging plane.

Figure 2:
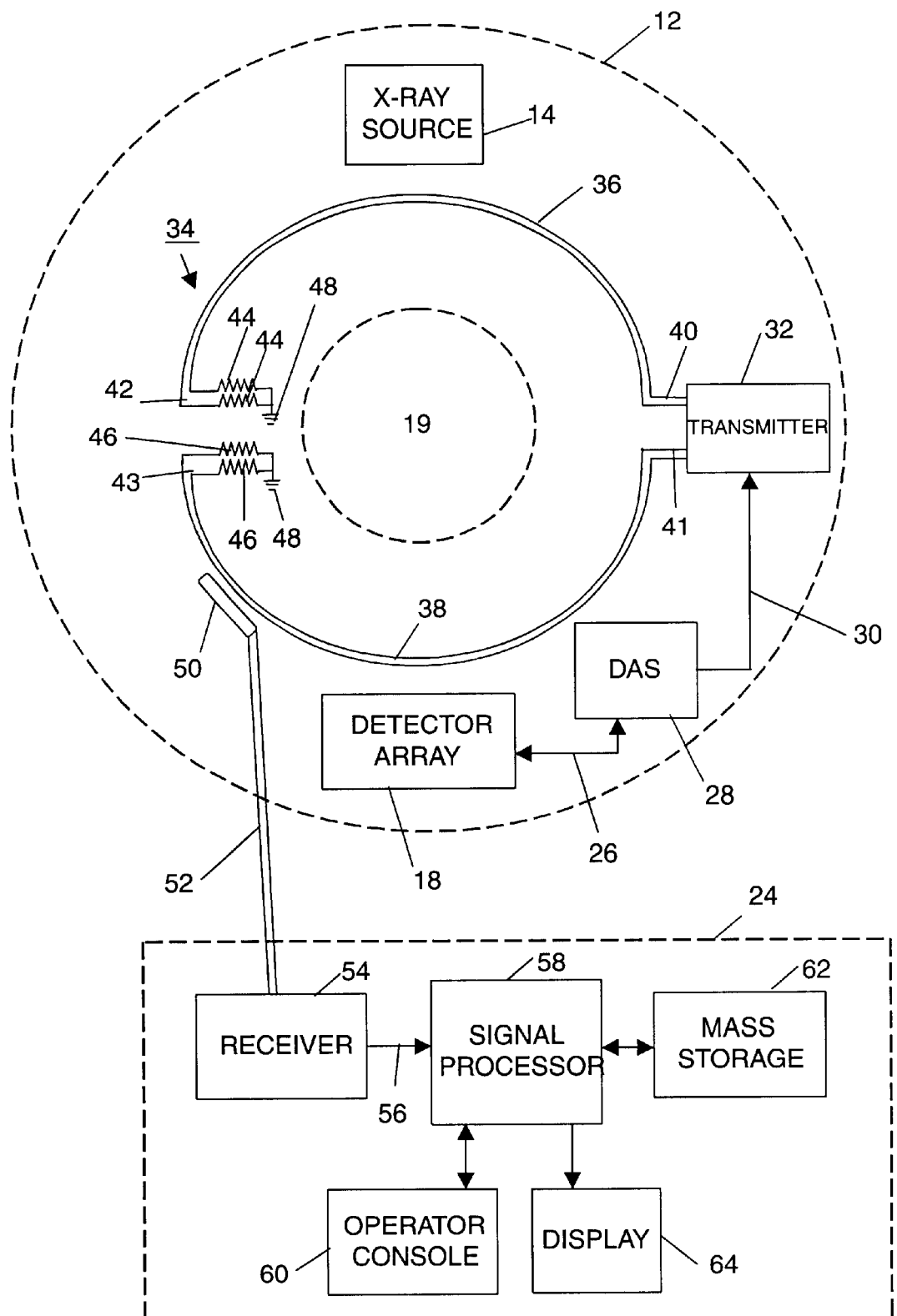
FIG. 2 is a schematic block diagram of portions of the CT system of FIG. 1.

Referring now to FIG. 2, there is shown a schematic block diagram of a portion of the CT system 10 of FIG. 1. It should be understood that only functional elements necessary for a teaching of the present invention are shown in FIG. 2 and that only the relative connections between functional elements are shown. The signals from the detector array 18 are provided through lines 26 to a data acquisition system (DAS) 28 disposed on rotating frame 12, which converts each signal from a detector element of detector array 18 from an analog signal format into a digital binary signal format, typically a 16 bit digital value representing the attenuated x-ray intensity. DAS 28 multiplexes the converted detector channel signals, together with a data clock signal and an error checking signal function, into a serial digital bit signal. The serial digital bit signal is then received by a transmitter 32, disposed on rotating frame 12, via lines 30. In the preferred embodiment, transmitter 32 digitally encodes the serial digital bit signal with amplitude modulation using a radio frequency (RF) carrier signal to produce a RF amplitude modulated digital serial data signal. For example, such an encoded data signal can be in a non-return to zero inverted (NRZI) format.

Next, the encoded data signal is presented from transmitter 32 to transmission line segments 36, 38 of a RF slipring 34. As described in further detail hereinafter, the encoded data signal is propagated along transmission line segments 36, 38 to be electromagnetically coupled into a coupler 50 disposed on the stationary frame 13. RF slipring 34 may be configured to include one or more transmission lines disposed on rotating frame 12. Depending on the distance, generally referred to as the air gap, between the coupler 50 and the transmission line segments 36,38, more transmission line segments may be required to ensure that coupler 50 is always in sufficient spatial proximity to at least one of the transmission line segments to receive the encoded data signal. When more then one segment is required, each segment will have a length that is a fractional portion of the arc length of the rotating frame's 12 rotational path. The segments are cascaded, end-to-end around the rotating frame's 12 rotational axis 22 (see FIG. 1), typically along the circumference of aperture 19, such that the aggregate segment length provides a substantially 360 degree arc, e.g., fully encircling the rotating frame 12.

In the preferred embodiment, two transmission line segments 36, 38 having first ends 40, 41 and second ends 42, 43, respectively, are contiguously positioned on rotating frame 12 encircling aperture 19 such that substantial continuity of electromagnetic coupling along the full rotational path of rotating frame 12 is possible. The first ends 40, 41 are connected to the transmitter 32, and the second ends 42, 43 are connected through terminal impedances 44, 46, respectively, to an electrical ground 48. The terminal impedances 44, 46 have a predetermined resistance value chosen to minimize reflection of energy in each of the transmission line segments 36, 38.

The coupler 50 is positioned on the stationary frame 13 (not shown in FIG. 2) such that physical proximity between coupler 50 and at least one of the transmission line segments 36, 38 will be maintained during rotation of rotating frame 12. In the preferred embodiment, the air gap between coupler 50 and the transmission lines 36, 38 of slipring 34 is in the range of 0.050 to 0.080 inches, and coupler 50 is a short piece of wire or transmission line approximately 2 inches in length. Coupler 50 may alternately be a pickup antenna, a RF shoe, a contactless brush, or an electromagnetic coupling apparatus capable of receiving the encoded data signal from the RF slipring 34 across a transmitting distance in the range of 0.050 to 0.080 inches.

Transmitter 32 transmits the encoded data signal to the first ends 40, 41 of the transmission lines 36, 38, respectively, and the encoded data signal propagates from the first ends 40, 41 to the second ends 42, 43 to be terminated at the electrical ground 48. Before the encoded data signal propagates to ground 48, however, the encoded data signal will be electromagnetically coupled to coupler 50, thereby completing the transfer from the rotating frame 12 to the stationary frame 13 for signal processing.

On the stationary frame side, the coupled encoded data signal, also referred to as the coupled modulated data signal, is transmitted to a receiver 54 located in the control and array processor 24 via lines 52. As described in further detail hereinafter in FIG. 3, the receiver 54 decodes the coupled modulated data signal to its pre-encoded state and provides this decoded signal to a signal processor 58 via lines 56. The signal processor 58 includes a computer and signal memory (not shown) for storing the program algorithms which govern the CT processing of the received data in response to operator commands and scanning parameters received via an operator console 60, such as a keyboard, mouse, trackball, or switches. Although not shown, the operator commands and parameters are used by the signal processor 58 to provide control signals and information to the DAS 28, the x-ray controller (not shown), the gantry motor controller (not shown), as well as controlling movement of platform 21. In this manner, the signal processor 58 collates the decoded signal, i.e. the projection data, into a composite view corresponding to a particular angular position of the rotating frame 12. Each composite view is stored in a mass storage device 62 and is retrieved as necessary during processing of other composite views to be further processed to provide a final image of the desired cross-section of test object 20. This final image, also referred to as a reconstructed image, can then be displayed on a display 64, for example as a conventional cathode ray tube (CRT) display, a liquid crystal display, or other display devices, or it may be converted to a film or printed record by means of an appropriate computer controlled camera or printer (not shown). Moreover, reconstructed images may be stored in the mass storage 62 and stored reconstructed images and/or other data may be retrieved as commanded by the operator via the operator console 60 and the signal processor 58.

Figure 3:
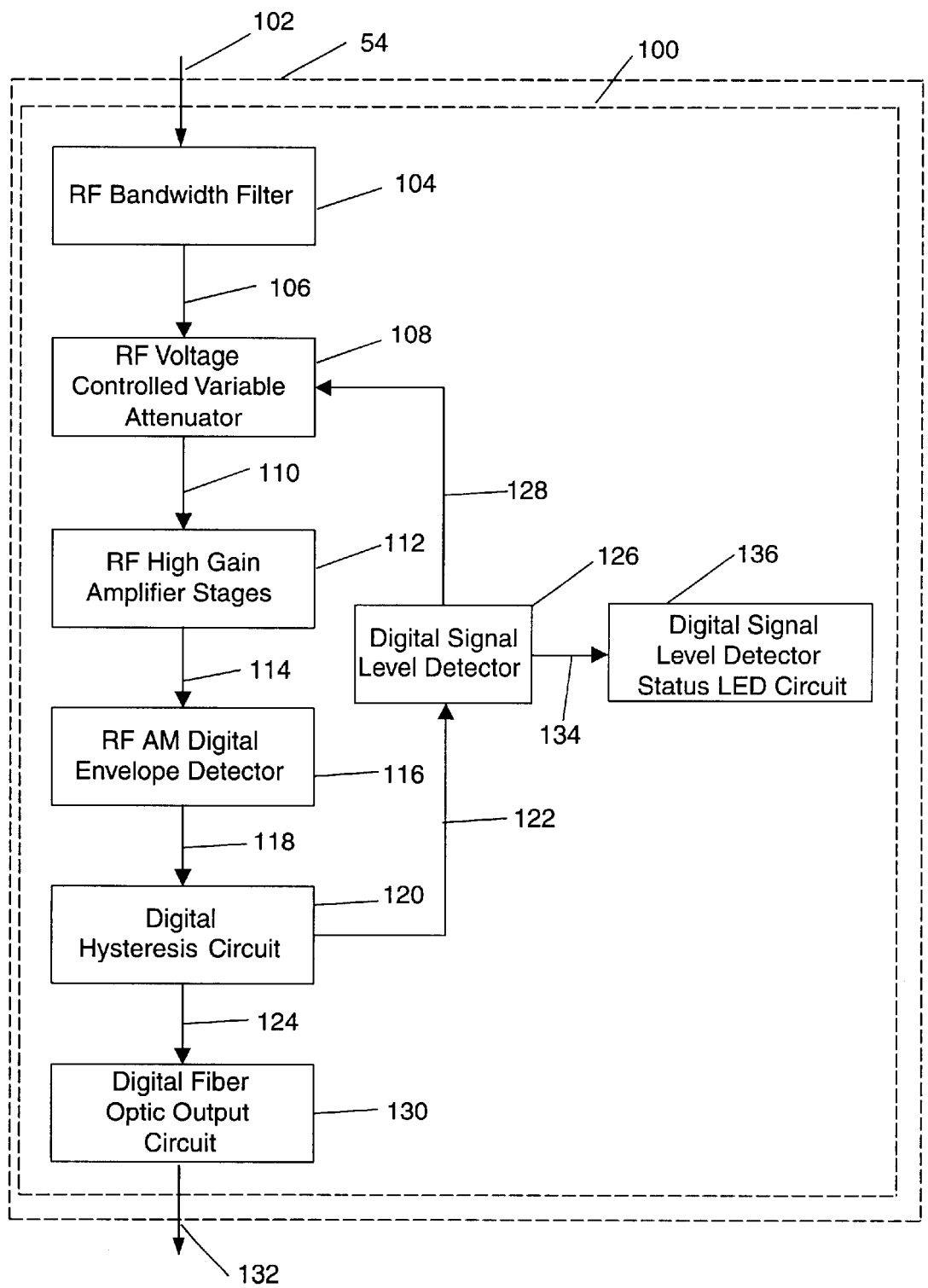
FIG. 3 is a block diagram of a portion of the receiver which forms part of the CT system of FIG. 1.

Referring now to FIG. 3, there is shown a block diagram of a portion of the receiver which forms part of the CT system of FIG. 1. The coupled encoded data signal, also referred to as a coupled modulated data signal 102, is provided on lines 52 (see FIG. 2) to an automatic RF attenuation loop 100 within the receiver 54. In the preferred embodiment, the attenuation loop includes a RF bandwidth filter 104, a RF voltage controlled variable attenuator 108, RF high gain amplifier stages 112, a RF amplitude modulation (AM) digital envelope detector 116, a digital hysteresis circuit 120, a digital signal level detector 126, a digital fiber optic output circuit 130, and a digital signal level detector status light emitting diode (LED) circuit 136. Also in the preferred embodiment, the coupled modulated data signal 102 has a power level range of up to 50 dBm (decibels referenced at 1 milliwatts) around a center operating power level of −13.6 dBm. Alternately, the coupled modulated data signal 102 can have a power level range of up to 40 dBm around a center operating power level.

The coupled data signal 102 is received by the RF bandwidth filter 104 and produces a bandwidth filtered signal 106. The bandwidth filter 104 filters the coupled data signal 102 in a bandwidth range of 500 MHz (megahertz) to 1 GHz (gigahertz) to remove signal components from frequencies outside the bandwidth range such as noise.

The bandwidth filtered signal 106 is received by the controlled variable attenuator 108 to produce an amplitude stabilized signal 110. The amount of attenuation applied to the bandwidth filtered signal 106 is determined by a feedback control voltage signal 128 also received by the controlled variable attenuator 108. Depending on the feedback signal 128, the amplitude stabilized signal 110 will be the same amplitude or up to 40 dB (decibels) smaller in amplitude than the bandwidth filtered signal 106. Thus, the controlled variable attenuator 108 selectively attenuates the amplitude of the received signal but preserves the frequency components therein.

The amplitude stabilized signal 110 is received by the amplifier stages 112 to produce an amplitude gain signal 114. The amplifier stages 112 amplifies the amplitude of the amplitude stabilized signal 110 by a gain of up to approximately 45 dB. Similar to the controlled variable attenuator 108, the amplifier stages 112 preserves the frequency components of the received signal. In the preferred embodiment, amplifier stages 112 comprises three amplifiers connected in series, each amplifier providing a gain of up to approximately 15 dB, for a total gain of approximately 45 dB. Such amplifiers can be a chip device made by Minicircuits and it is well-known in the art that an amplifier chip device will have various other driving components such as capacitors, other circuits, coils, etc. to provide biasing and other functionally necessary inputs.

The amplitude gain signal 114 is received by the digital envelope detector 116 to produce a digitized signal 118. The digital envelope detector 116 removes the RF component of the amplitude gain signal 114, thereby digitizing signal 114. Prior to the digital envelope detector 116, the signal is still amplitude modulated with a RF carrier signal and although a digital signal, contains sine waveforms. But after the digital envelope detector 116, signal 114 has essentially been converted to a digital square wave. The digital envelope detector 116 is available as a Minicircuits device and alternatively could be a modulator circuit implemented as an amplitude modulation detector.

The digitized signal 118 is received by the digital hysteresis circuit 120 to produce a noise-filtered digitized signal 124 and an amplitude signal 122. The digitized signal 118 entering the hysteresis circuit 120 is a square wave containing some noise components because the digital envelope detector 116 is typically unable to remove all the RF components of the amplitude modulation. Thus the hysteresis circuit 120 serves to filter out the residual undesirable signal components, such as noise, remaining in the signal after the digital envelope detector 116, by adding hysteresis to the digitized signal 118, as is well-known in the art, to generate the noise filtered digitized signal 124. Although not shown, hysteresis circuit 120 will have associated resistors and capacitors connected thereto to provide a certain turn on and turn off hysteresis. Alternatively, the hysteresis circuit 120 may be a digital buffer gate, a digital noise filter circuit, or a NRZI data screen. The hysteresis circuit 120 also serves a dual function in that the digitized signal 118 is used to generate the amplitude signal 122, which is a voltage signal having its amplitude representative of the amplitude of the digitized signal 118.

The amplitude signal 122 is received by the digital signal level detector 126 to produce the feedback control voltage signal 128 and a status signal 134. The digital signal level detector 126 converts the amplitude signal 122 into the feedback signal 128 which is a low-frequency voltage signal (almost a direct current (DC) signal) representative of the digitized signal 118. The response rate of the feedback signal 128 is around 100 milliseconds which is orders of magnitude slower then the response rates of the rest of the attenuation loop 100. The feedback signal 128 is received by the controlled variable attenuator 108, completing the feedback loop to maintain the amplitude of the digitized signal 118 at roughly the same level or range by controlling the amount of attenuation provided in the controlled variable attenuator 108, the amount of attenuation representative of the level of the feedback signal 128.

The status signal 134 received by the digital signal level detector status LED circuit 136 is an indicator signal of the voltage level within the attenuation loop 100, particularly the level of the digitized signal 118. The status circuit 136 includes indicia means for displaying or indicating the relative range of this operating voltage level. For example, status circuit 136 can include a set of bar graph LEDs (not shown) that displays the relative range of this operating voltage level. When the voltage is at the maximum limit, which means that the controlled variable attenuator 108 is letting the bandwidth filtered signal 106 through with no attenuation, all the bar graph LEDs will be illuminated. Conversely, when the voltage is very low, which means that the controlled variable attenuator 108 is providing maximum attenuation to the bandwidth filtered signal 106, only one or two LEDs at one end will be illuminated. Optimally the voltage level will be a mid-gain level such that the bar graph LEDs comprised of 10 LEDs in a row will have the fifth or sixth such LED illuminated. In this manner, the number of LEDs illuminated in the status circuit 136 can increase or decrease to continually reflect the signal level operating with the attenuation loop 100. Alternatively, the status circuit 136 may include a numerical display, a LCD indicator, or other indicator means capable of providing the relative signal level information. In the preferred embodiment, the bar graph LEDs within status circuit 136 are housed within the receiver 54 to provide diagnostic-type information to field service personnel such that the CT system operator or end-user typically will not be aware of or view these bar graph LEDs.

Lastly, the noise filtered digitized signal 124 is received by the digital fiber optic output circuit 130 for converting signal 124, which is now in its pre-encoded or pre-modulated state similar to the serial digital data signal outputted by DAS 28 (see FIG. 2), into a digital fiber optic signal 132 suitable for transmission in a fiber optic cable. In the preferred embodiment, the digital fiber optic output circuit 130 is a chip device which is well-known in the art. Then digital fiber optic signal 132 may be transmitted to the signal processor 58 (see FIG. 2) via lines 56 or signal 132 may be further processed before being transmitted to the signal processor 58 via lines 56. Thus, the present invention provides a data signal receiver having an extensive dynamic input range and which also provides an elegant means for correcting or compensating for various signal variations based on the received signal strength. In this manner, the quality of RF communication is much improved without the need for additional mechanical fine tuning such as special test equipment to repeatedly calibrate and center the center operating power level in the slipring assembly.

While the embodiments and application of the invention illustrated in the FIGs. and described above are presently preferred, it should be understood that these embodiments are offered by way of example only. For example, the RF carrier signal described herein may be at a different frequency or the modulation scheme described herein may be a modulation type different from amplitude modulation. The slipring and coupler may communicate using a capacitive type coupling, which also suffers from signal variability to some degree, instead of electromagnetic coupling such that the receiver described herein may be implemented by including other combinations or types of signal processing devices. Still further, although all of the communication between the rotating frame and the stationary frame has been serialized in the preferred embodiment, i.e., converted from parallel to serial data for transmission and vice versa on reception employing well-known multiplexing techniques, this was done so that only a single data stream need be transmitted. It should be understood that multiple parallel paths could be employed using multilevel or multibase encoding techniques to further increase the maximum data rate transfer.

Even still further, the encoded data signal may have a even wider signal variation range than the 40 dBm or 50 dBm described herein such that the controlled variable attenuator would correspondingly have to provide an appropriate range of attenuation and the amplifier stages would have to provide greater gain than described herein. Furthermore, it is contemplated that the invention may be applied to systems other than medical systems which can benefit from the use of feedback-based signal attenuation. Accordingly, the present invention is not limited to a particular embodiment, but extends to various modifications that nevertheless fall with the scope of the appended claims.

What is claimed is:

1. An apparatus for demodulating and digitizing a modulated data signal possibly having a wide range of power levels, comprising:

a variable attenuation circuit configured to attenuate an amplitude of the modulated data signal in response to a feedback signal to generate an amplitude stabilized signal;

a conversion circuit coupled to the variable attenuation circuit and configured to remove a modulation component from the amplitude stabilized signal to generate a digitized signal;

a circuit coupled to the conversion circuit and configured to generate a reconstructed digital data signal and an amplitude signal from the digitized signal, wherein the reconstructed digital data signal is representative of the modulated data signal in a pre-modulated state and the amplitude signal is representative of an amplitude of the digitized signal; and an attenuation controller coupled to the circuit and the variable attenuation circuit, wherein the attenuation controller is configured to generate the feedback control signal from the amplitude signal.

2. The apparatus of claim 1, further comprising:

a bandwidth filter coupled to the variable attenuation circuit and configured to filter the modulated data signal; and an amplifier coupled to the variable attenuation circuit and the conversion circuit, wherein the amplifier is configured to provide a gain of up to 45 dB to the amplitude stabilized signal.

3. The apparatus of claim 2, wherein the bandwidth filter has a bandwidth range of 500 MHz to 1 GHz.

4. The apparatus of claim 1, wherein the circuit comprises a digital hysteresis circuit configured to add hysteresis to the digitized signal.

5. The apparatus of claim 1, wherein the conversion circuit comprises a radio frequency (RF) amplitude modulation digital envelope detector.

6. The apparatus of claim 1, wherein the modulated data signal comprises a signal having a power level range of up to 50 dBm around a center operating power level.

7. The apparatus of claim 1, wherein the modulated data signal comprises a signal having a power level range of up to 40 dBm around a center operating power level.

8. The apparatus of claim 1, wherein the feedback signal applied to the variable attenuation circuit is configured from a previous modulated data signal.

9. The apparatus of claim 1, wherein the modulated data signal comprises a signal having a center operating power level of approximately −13.6 dBm.

10. The apparatus of claim 1, wherein the modulated data signal comprises a series digital bit data signal that is amplitude modulated with a radio frequency (RF) carrier signal.

11. An apparatus for demodulating and digitizing a modulated data signal possibly having a wide range of power levels, comprising:
   means for variably attenuating the modulated data signal in response to a feedback signal to generate an amplitude stabilized signal;
   means for digitizing the amplitude stabilized signal to generate a digitized signal;
   means for filtering the digitized signal to generate a reconstructed digital data signal representative of the modulated data signal in a pre-modulated state; and
   means for generating the feedback signal in response to the digitized signal, wherein the feedback signal is representative of an amplitude of the digitized signal.

12. The apparatus of claim 11, further comprising means for bandwidth filtering the modulated data signal, wherein the means for bandwidth filtering has a bandwidth range of 500 MHz to 1 GHz.

13. The apparatus of claim 11, further comprising means for amplifying the amplitude stabilized signal, wherein the means for amplifying is configured to provide a gain of up to approximately 45 dB.

14. The apparatus of claim 11, wherein the means for filtering comprises a digital hysteresis circuit, a digital buffer circuit, a digital noise filter circuit, or an NRZI data screen.

15. The apparatus of claim 11, wherein the means for digitizing comprises a radio frequency (RF) amplitude modulation digital envelope detector.

16. The apparatus of claim 11, wherein the means for generating comprises a digital hysteresis circuit and a digital signal level detector.

17. The apparatus of claim 11, wherein the modulated data signal comprises a signal having a power level range of up to 50 dBm around a center operating power level.

18. The apparatus of claim 17, wherein the center operating power level is approximately −13.6 dBm.

19. The apparatus of claim 11, wherein the means for variably attenuating provides an attenuation range of −40 dB to 0 dB.

20. The apparatus of claim 11, wherein the feedback signal applied to the means for variably attenuating is configured from a previous modulated data signal.

21. A method for demodulating and digitizing a modulated data signal possibly having a wide range of power levels, the method comprising the steps of:
   transmitting the modulated data signal from a first location;
   receiving the modulated data signal at a second location, wherein the first and second locations are remote from each other;
   attenuating an amplitude of the modulated data signal in response to a previous modulated data signal via a feedback loop; and
   converting the modulated data signal into a reconstructed digital data signal, wherein the reconstructed digital data signal is representative of the modulated data signal in a pre-modulated state, the attenuating and converting steps are carried out at the second location, and the modulated data signal comprises a signal having a power level range of up to 50 dBm around a center operating power level.

22. The method of claim 21, wherein the attenuating step includes attenuating the amplitude in a range of −40 dB to 0 dB.

23. The method of claim 21, wherein the converting step includes demodulating the modulated data signal and filtering the modulated data signal.

24. The method of claim 23, wherein filtering the modulated data signal includes introducing a hysteresis to the modulated data signal.

25. The method of claim 21, wherein the center operating power level is approximately −13.6 dBm.

* * * * *